(12) United States Patent
Beers et al.

(10) Patent No.: US 6,286,131 B1
(45) Date of Patent: Sep. 4, 2001

(54) DEBUGGING TOOL FOR LINGUISTIC APPLICATIONS

(75) Inventors: Jennifer Jane Hadlock Beers, Bothell; Samuel C. Atwater, Duvall; David Arthur Bullock, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/984,540

(22) Filed: Dec. 3, 1997

(51) Int. Cl.$^7$ .................................................... G06F 9/445
(52) U.S. Cl. ...................... 717/4; 717/3; 717/5; 703/22; 704/8; 704/9
(58) Field of Search ...................................... 395/704, 703, 395/705; 717/4, 3, 5; 704/8, 9; 703/22

(56) References Cited

U.S. PATENT DOCUMENTS

| | | | |
|---|---|---|---|
| 5,045,994 | * 9/1991 | Belfer et al. | 395/500 |
| 5,475,843 | * 12/1995 | Halviatti et al. | 395/704 |
| 5,703,788 | * 12/1997 | Shei et al. | 364/488 |
| 5,754,760 | * 5/1998 | Warfield | 395/183.14 |
| 5,758,062 | * 5/1998 | McMahon et al. | 395/183.14 |
| 5,781,720 | * 7/1998 | Parker et al. | 395/183.14 |
| 5,856,984 | * 1/1999 | Rushworth | 371/22.1 |

OTHER PUBLICATIONS

Boris Beizer, Data Systems Analysts, "Software Testing Techniques", Van Nostrand Reinhold Company, pp. 1–14, 170–190, 1983.*
Lehmann et al. "TSNLP—Test Suites For Natural Language Processing" Jul. 15, 1996.

* cited by examiner

Primary Examiner—Mark R. Powell
Assistant Examiner—Ted T. Vo
(74) Attorney, Agent, or Firm—Leydig, Voit & Mayer, Ltd.

(57) ABSTRACT

A debugging tool which generates information useful as an aide in debugging a computer-executable application which accepts an input and generates an output as a function of the input. The tool is used to initiate the execution of the computer-executable application and supply as an input thereto test objects selected from a database. The output generated as a result of the test objects is formed into actual result objects which are then compared to either expected result objects, which have been entered by the user, or previously archived actual result objects, which have been generated by a previous use of the tool. The comparison provides meaningful information for use in evaluating the current state of the computer-executable application. Providing the objects with various tags allows the objects or information contained therein to be grouped according to some desired criteria and/or pulled from the database for examination in response to a query.

6 Claims, 8 Drawing Sheets

Job - Noah 2.0 nighty regression

Name: Noah 2.0 nighty regression

Scheduled time
○ Run now
⦿ Run later

☑ Monday
☑ Tuesday
☑ Wednesday
☑ Thursday
☑ Friday
☐ Saturday
☐ Sunday

Time to run: 11 : 00    ○ AM
                       ⦿ PM

Last 12 / 31 / 97

Save    Cancel

Job type
⦿ Generate results set
   Driver settings: Noah 2.0 formal
   Phrase group: Brown corpus
○ Compare results sets
   Primary set: Most recent nightly regression
   Secondary set: Second most recent nightly regression Completed job information
Last start time: 12/12/98-2300    Last finish time: 12/13/96-0454
Last completion status : No errors

DEBUGGING TOOL FOR LINGUISTIC APPLICATIONS

FIELD OF THE INVENTION

This invention relates generally to debugging tools and, more particularly, relates to a debugging tool for use in connection with linguistic applications.

BACKGROUND OF THE INVENTION

Evaluation of linguistic or natural language processing ("NLP") applications, e.g. spell checker, grammar checker, etc., plays an increasingly important role in both the academic and industrial natural language communities. Specifically, the growing language technology industry needs measurement tools to allow researchers, engineers, managers, and customers to track development, evaluate and assure quality, and assess suitability for a variety of applications. Currently, two tools are used for evaluating and testing NLP applications, namely, test suites and test corpora. Test suites can generally be described as focused data sets made up by researchers, etc. for testing a specific aspect of a NLP application while test corpora can generally be described as naturally occurring sets of text.

One specific approach for evaluating NLP applications is discussed in a paper entitled "TSNLP-Test Suites for Natural Language Processing" by Lehmann et al., published on Jul. 15, 1996, which paper is incorporated herein by reference in its entirety. The TSNLP approach is based on the assumption that, in order to yield informative and interpretable results, any test items used for an actual test or evaluation must be specific to the application and the user since every NLP application (whether commercial or under development) exhibits specific features which make it unique and every user (or developer) of a NLP system has specific needs and requirements. The TSNLP approach is also guided by the need to provide test items that are easily reusable.

To achieve these two goals of specificity and reusability, the TSNLP paper suggests the abandonment of the traditional notion of test items as a monolithic set in favor of the notion of a database in which test items are stored together with a rich inventory of associated linguistic and non-linguistic annotations. The test item database thus serves as a virtual database that provides a means to extract relevant subsets of the test data suitable for some specific task. Using the explicit structure of the data and given TSNLP annotations, the database engine allows for the searching and retrieving of data from the virtual database, thereby creating a concrete database instance according to arbitrary linguistic and extra-linguistic constraints.

To provide for the control over the test data when performing an evaluation of an NLP application, the TSNLP paper emphasizes the value of using test suites in lieu of test corpora since test suites provide the ability to focus on specific linguistic phenomena. This focus is particularly achieved by following the requirement that as many linguistic parameters as possible within the test suite be kept under control. For example, since vocabulary is a controllable linguistic parameter, the TSNLP approach requires the restriction of vocabulary in size as well as domain. Additionally, the TSNLP approach attempts to control the interaction of phenomena by requiring that the test items be as small as possible.

The TSNLP paper also suggests the desirability of providing progressivity that is the principle of starting from the simplest test items and increasing their complexity. In the TSNLP approach, this aspect is addressed by requiring that each test item focus only on a single phenomenon that distinguishes it from all other test items. (For each phenomenon within a test item the application under test should generate a phenomenon response, e.g., for each misspelled word within a sentence a spell checker should generate a list of alternative word suggestions). In this manner, test data users apply the test data in a progressive order resulting in the special attribute presupposition in the phenomenon classification.

While the approach for evaluating NLP applications as taught in the TSNLP paper does work for its intended purpose, the above-noted requirements cause the TSNLP approach to suffer the disadvantage of not allowing for the efficient testing of real user sentences with multiple errors on a large scale. In addition, since the base TSNLP approach only provides for queries that tally failures, the TSNLP approach for evaluating NLP applications provides information which may not completely reflect the behavior of the NLP application. For example, a test suite comprising "This are a test." may produce an actual result of "This is an test." when utilized as an input to an NLP application which, utilizing the TSNLP approach, would result in a flagged Subject-Verb failure without alerting the developer that the NLP application had a failed A/An correction and a bad rewrite. This inability to track uncommon patterns in the behavior of an NLP application on a more granular level renders the TSNLP approach for evaluating NLP applications susceptible to minor changes in the output of the underlying NLP application. Accordingly, the TSNLP a approach still requires an undesirably large amount of resources and time to identify and fix individual symptom bugs in an NLP application.

These deficiencies are also found in another tool for tracking problems found when evaluating NLP applications, dubbed "RAID", which has been used internally within Microsoft. Specifically, RAID similarly requires that each test item focus only on a single phenomenon which distinguishes it from all other test items. This is required because the database scheme and associated simple querying method implemented in RAID fails to allow for the tracking of complex relationships between system bugs, which the user sees, and underlying product bugs. Accordingly, RAID likewise suffers the disadvantage of not allowing for the efficient testing of real user sentences with multiple errors on a large scale. Furthermore, the base implementation of RAID also is limited to queries that tally failures which, as discussed previously, renders this method of evaluating NLP applications highly susceptible to minor changes in the output of underlying NLP application(s).

SUMMARY OF THE INVENTION

To overcome these noted disadvantages and deficiencies, the present invention is directed to a tool which can be used to automatically generate information useful as an aide in debugging a computer-executable application. The computer-executable application, preferably in the form of an NLP application, accepts an input and generates an output as a function of the input. In particular, the tool is preferably used to initiate the execution of the computer-executable application and supply as an input thereto test objects selected from a database. The output generated as a result of the test objects is formed into actual result objects. The tool then initiates a comparison between the actual result objects and either expected result objects, which have been generated by the developer, etc., or to archived actual result objects, which were generated by a previous use of the tool.

By comparing the actual result objects with the expected result objects and/or the actual result objects with the archived actual result objects meaningful information is generated which is valuable for use in evaluating the current state of the computer-executable application. For example, the comparisons will have the effect of notifying developers of new bugs and/or suspicious patterns in the behavior of the application which may be indicative of bugs. In addition, developers can utilize the comparison results to get a better sense of the magnitude of the user-perceived impact of a bug, because the tests can be run over a set of real-world test inputs that are balanced to represent a real user corpora. Furthermore, the comparison results will provide developers with the ability to readily discern the impact of a fix to the application.

The ability to track this information is further enhanced by providing the various objects with various tags to which labels may be dynamically mapped. In this manner, the objects may be efficiently grouped and/or uncovered using a navigator or querying tool such that the behavior of the application in response to certain phenomenon may be tracked. Importantly, the behavior of the application can be tracked regardless of the number of phenomenon within the test objects or the number of phenomenon results within the expected result, actual result, or comparison result objects.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
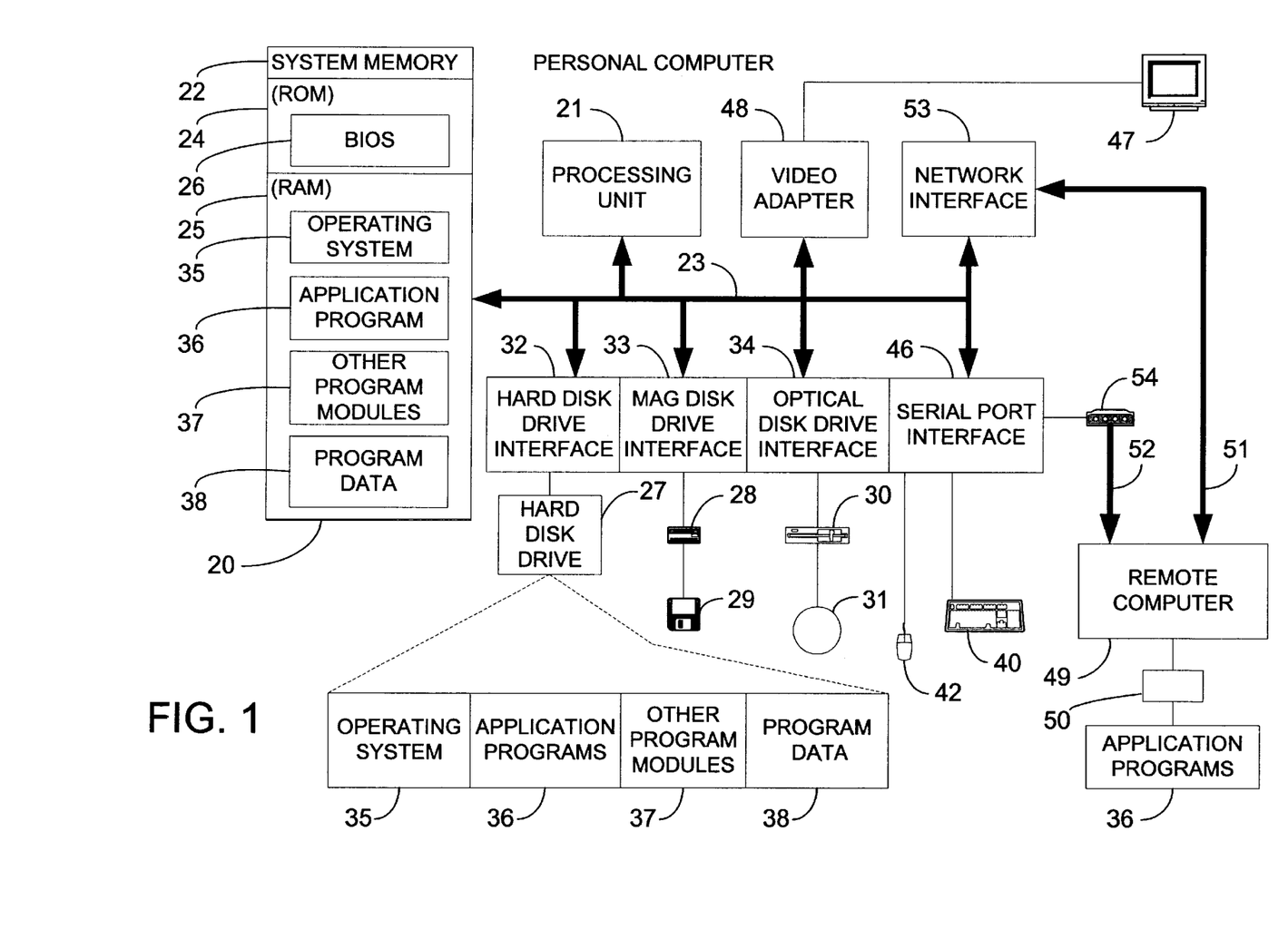
FIG. 1 is a block diagram generally illustrating an exemplary computer system on which the present invention for performing debugging resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by the computer system 20, unless indicated otherwise. As such, it will be understood that such acts and operations, which are at times referred to as being computer-executed, include the manipulation by the CPU 24 of electrical signals representing data in a structured form. This manipulation transforms the data or maintains it at locations in the memory system 22, which reconfigures or otherwise alters the operation of the computer system 20 in a manner well understood by those skilled in the art of computer systems. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
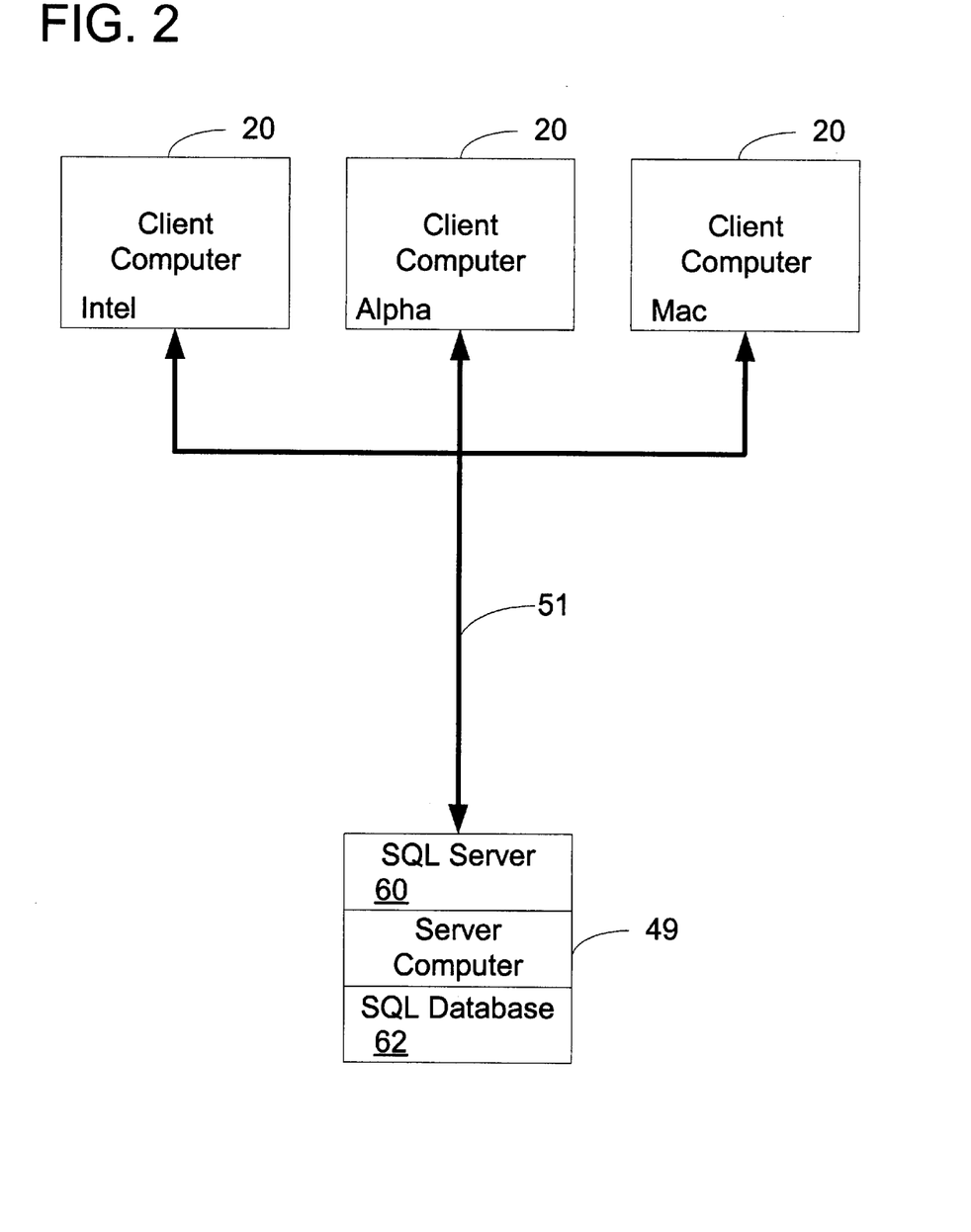
FIG. 2 is a block diagram more specifically illustrating certain of the components of the exemplary computer system illustrated in FIG. 1.
Figure 3A:
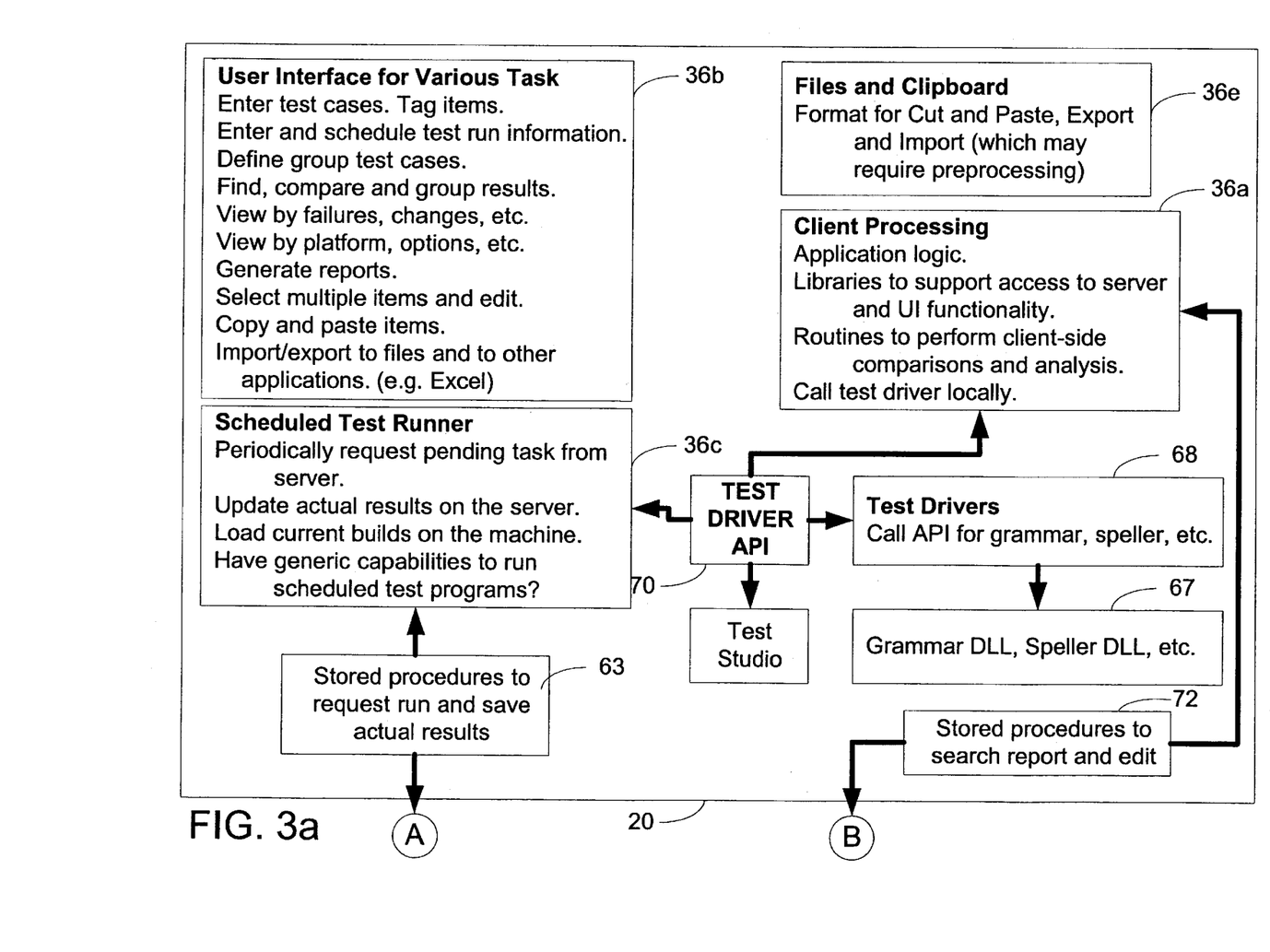
FIG. 3 is a block diagram more specifically illustrating the components of the exemplary computer system illustrated in FIG. 2.
Figure 3B:
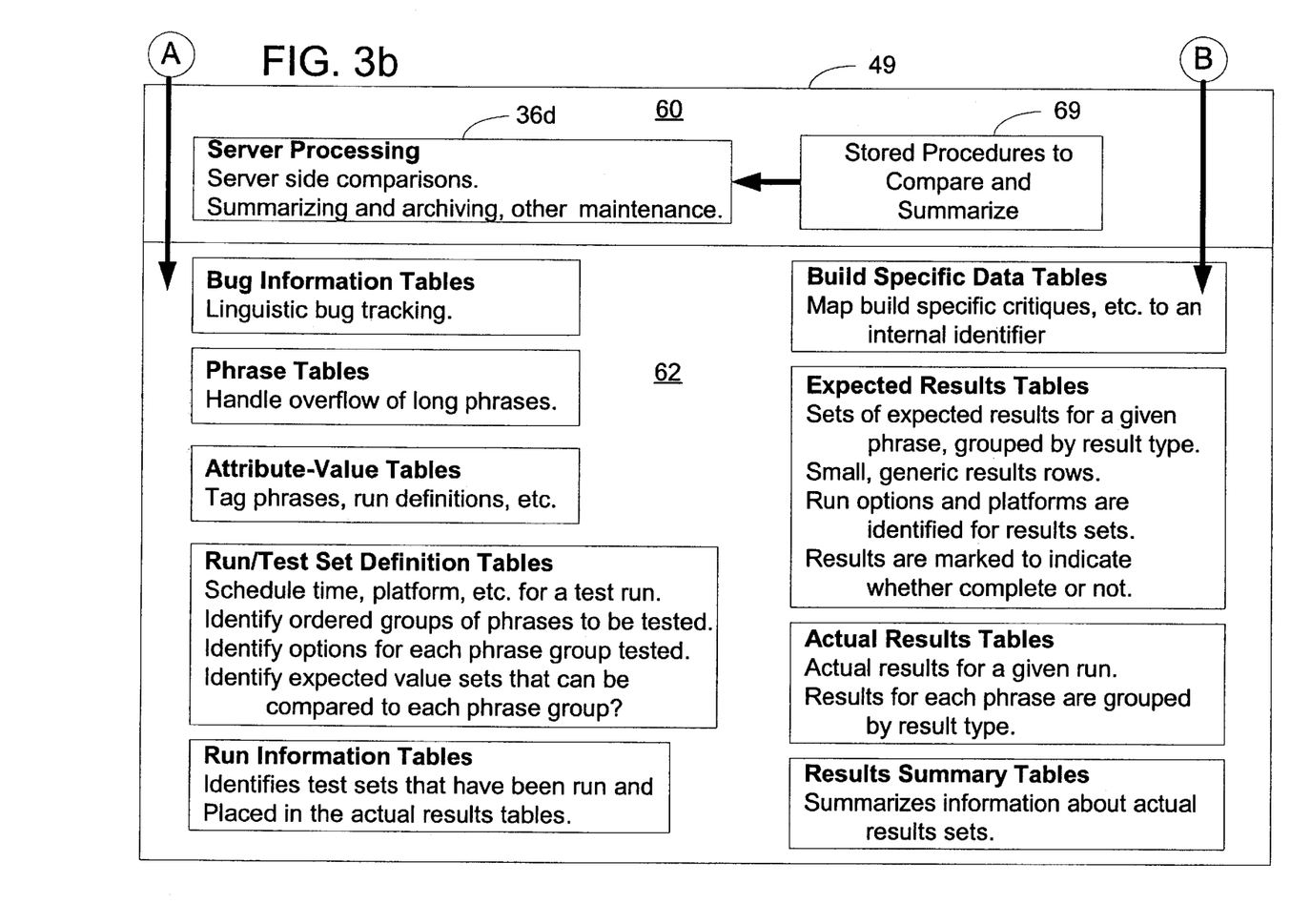

As previously mentioned, the invention is preferably realized within the computer environment illustrated in FIG. 1 as one or more computer-executable applications 36. In accordance with the present invention, certain of these applications 36 are provided to generate and organize information useful in the debugging of linguistic applications, i.e., find, prioritize, and communicate linguistic pattern bugs which may reside within an NLP application. To support this testing of NLP application(s), the network environment, which is more particularly illustrated in FIGS. 2 and 3, further includes a database 62 which is linked to the server computer 49. The server computer 49, which includes an SQL server 60, is linked via the LAN 51 to one or more platform independent computer systems 20.

More specifically, each of the computer systems 20 include various client processing applications 36*a* as well as one or more applications 36*b* which are used to accept input from the user input devices. Among the client processing applications 36*a* are the NLP application(s) which are to be tested in accordance with the present invention. Preferably, the NLP application(s) are implemented as DLL(s) 67 such as the Grammar DLL, Speller DLL, etc. illustrated in FIG. 3. The computer systems 20 also includes various test driver DLLs 68, using a test driver API 70, that provide the means for the various applications 36 to communicate. As the specifics relating to the interaction of the various applications 36 will be well understood by those of skill in the computer art, such interactions will not be discussed in greater detail herein. As will be further understood by those of skill in the art, the applications 36*b* are preferably used to implement a graphical user interface which allows users to enter the commands required to direct the operation of the applications 36 in a well known manner.

The computer systems 20 further include an application 36*c* in the form of a scheduled test runner for performing the task of initiating the testing of the NLP application(s). The scheduled test runner 36*c*, which preferably allows test runs to be performed at the immediate request of the user or delayed until some user specified time such as, for example, overnight, interacts with the server computer 49 via stored procedures 63. In particular, with reference to FIG. 4, if the computer system 20 has the generic capability to run scheduled test programs, the scheduled test runner 36*c* oversees the collection in step 74 of specified test objects from the database 62, the forwarding in step 76 of these test objects to a selected NLP application for processing thereby, and storing in step 78 the actual results of the processing of the test objects by the NLP application within the database 62 as actual result objects. Typically, this procedure will involve the passing of large numbers of test objects to the NLP application(s) under test during each run of the scheduled test runner 36*c*.

Figure 5:
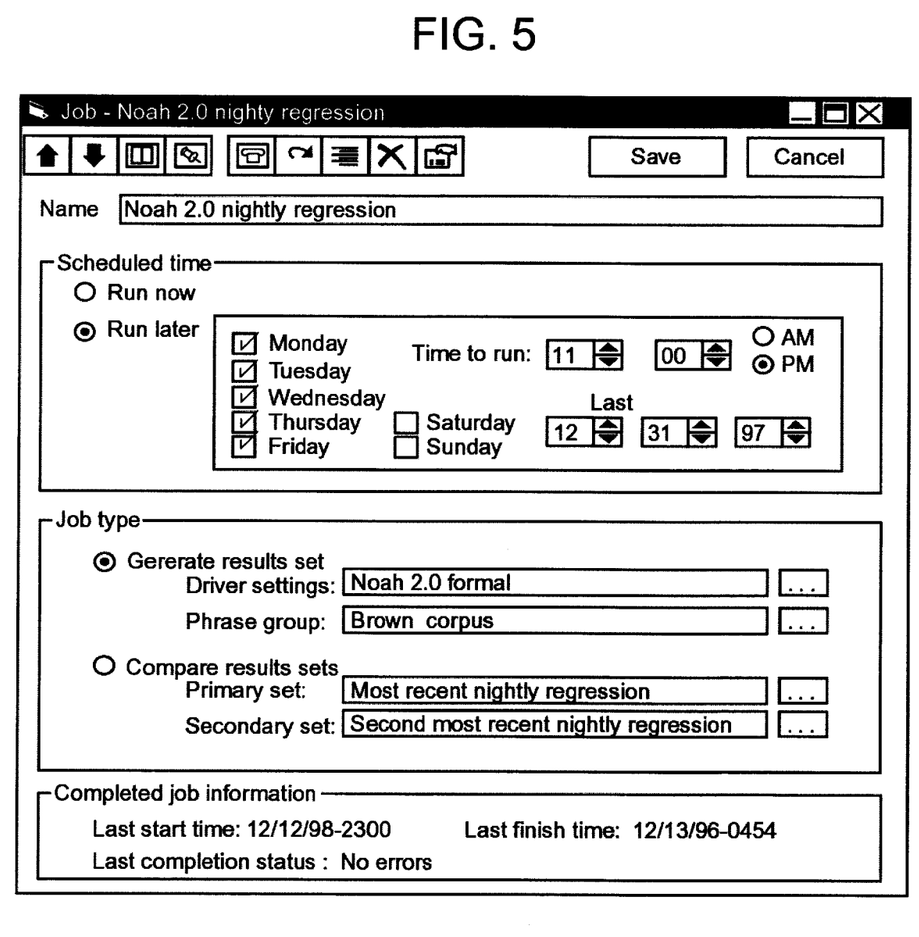
FIGS. 5–7 are illustrations of exemplary graphical user interfaces for use in commanding various operations made available by the present invention.

In accordance with the above-described test procedure, FIG. 5 illustrates an exemplary graphical user interface which allows the user to enter the commands which are used by the scheduled test runner 36*c*. In particular, these commands may include the time at which the test run is to commence and the source of the test objects which are to be used in the test. It will be appreciated, however, that the scheduling of delayed test runs can be implemented using the operating system's scheduler rather than the custom scheduler, marked "Run Later," which is depicted in FIG. 5.

The test objects which are passed to the NLP application(s) under test by the scheduled test runner 36*c* preferably consist of phrases (i.e., one or more sentences) which are typically imported from documents in the form of real world test corpora. Accordingly, the test objects utilized in connection with the present invention are not limited to a single phenomenon but include sentences typically having one or more linguistic errors. By way of example, the test objects are stored in a matrix within the database 62 in the following format:

objectid|row|column|stringid where:

objectid is a test object identification tag;

row and column identify the position of a string in the two-dimensional matrix representing the test object; and stringid identifies the string at the indicated position in the matrix (the text of the string is stored in a separate table as a varchar(255)).

According to this format, an exemplary test object may be stored within the database 62 as follows:

|       | column 1                          | column 2 | column 3 |
| ----- | --------------------------------- | -------- | -------- |
| row 1 | Remember,                         | BOLD     |          |
| row 2 | when sending inter-office mail:   |          |          |
| row 3 | do not send food,                 |          | BULLET   |
| row 4 | do not send clothing,             |          | BULLET   |
| row 5 | and never send cash.              | ITALIC   | BULLET   |

While the illustrated implementation of input objects is simplified to included only text and text overflow, it is contemplated that the matrix may include character and paragraph formatting in a further implementation. Additionally, it will be appreciated that the test corpora need not be limited to the form of a sentence and may include single words, phrases, items in list, etc.

For purposes which will become apparent from the description which follows, the database 62 has similarly stored therein expected result objects and actual result objects. The expected result objects are entered by the user as a function of what the user believes will be the result from a test run of a NLP application when a specific one of the test objects is provided thereto for processing. One or more expected result objects may be associated with each test object as expected result objects may differ by version of the NLP application being tested, by platform, or by API run options (formal vs. informal, i.e., the amount of specificity with which the errors perceived by the NLP application under test are reported).

The expected result objects are also preferably stored within the database in a matrix, however, the exact storage format will depend upon the application under test. Nevertheless, strings stored in the matrix are generally of the smallest interesting level of detail, closely related strings are generally stored in columns of the same row, column position may be significant, and row and column order may be significant. As an example, a preferred storage format for certain types of expected result objects includes an expected object identification tag and, for each linguistic error within the test item, an error label, the offset location of the error, the character length of the error, the error character string, and the character string which should be generated by the NLP application when the test item is applied thereto. According to this format, an exemplary expected result object may be stored within the database 62 in an inverted string index format as follows:

| Expected Result-A | | | | |
|---|---|---|---|---|
| ID TAG | | | | |
| Uncapitalized First Word | 1 | 5 | cause | Cause |
| End of Results | | | | |

Figure 6:
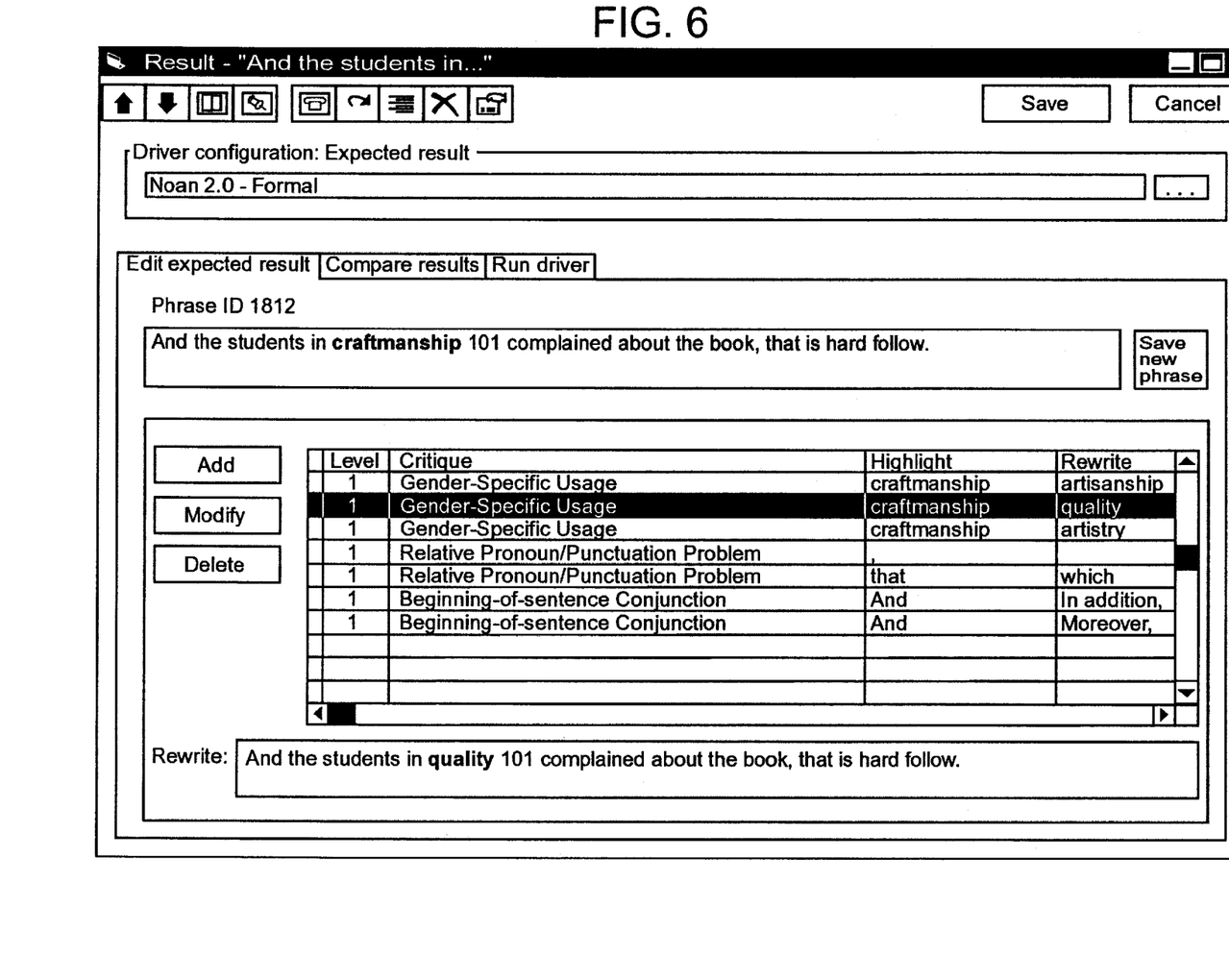

An example of a graphical user interface which allows an expected result object to be created, deleted, or edited is illustrated in FIG. 6.

The actual result objects which are also stored within the database 62 are indicative of the actual results produced by the NLP application(s) under test in response to a test object. Specifically, the information which is returned from the NLP application under test is parsed and, thereafter, forwarded to the database 62 for storage. The preferred storage format for the actual result objects is similar to the storage format of the expected result objects and, for the given example, includes an actual result object identification tag and, for each linguistic correction made by the NLP application under test, an internal identifier tag, the offset location of the perceived error, the character length of the perceived error, the perceived error character string, and the character string of the correction suggested by the NLP application in response to the perceived error. According to this format, an exemplary actual result object may be stored within the database 62 as follows:

| Actual Result-B | | | | |
|---|---|---|---|---|
| ID TAG | | | | |
| Critique_123 | 1 | 5 | cause | Cause |
| Critique_198 | 42 | 5 | never | never, |
| End of Results | | | | |

(In this example, "Critique_198" represents a false flag, i.e., a linguistic error in the test object perceived by the NLP application under test where, in fact, no error actually existed.) For reasons which will be discussed in greater detail hereinafter, the internal identifier tags (e.g., "Critique_198") are preferably not stored as human-readable labels.

Figure 4:
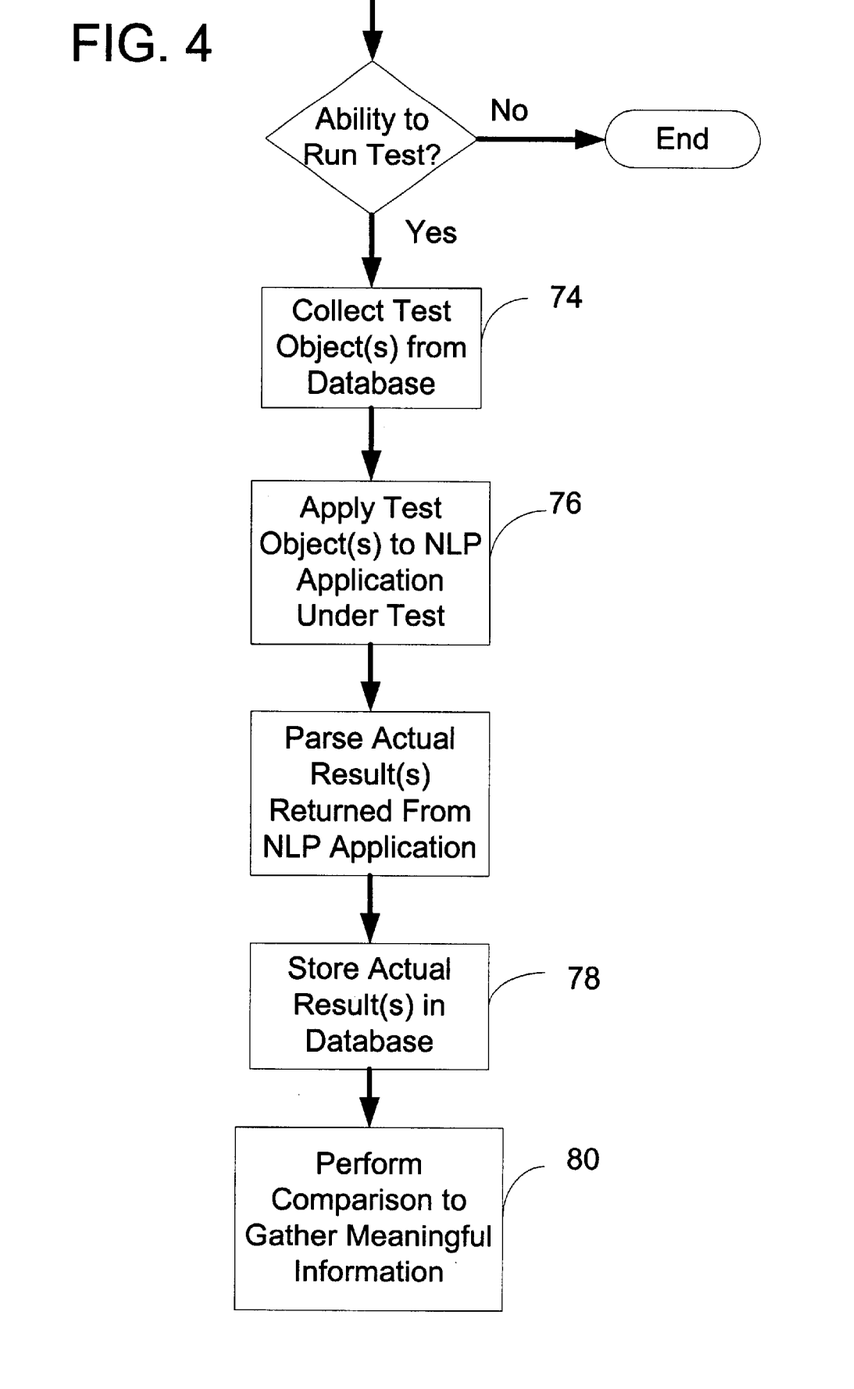
FIG. 4 is a flow chart diagram illustrating an exemplary method for performing debugging in accordance with the present invention.

Once the test run of the NLP application has been completed by the scheduled test runner 36c and the actual result objects have been stored within the database 62, the debugging process continues in FIG. 4 by performing, in step 80, a comparison. The comparison performed in step 80, preferably in the form of a generic comparison algorithm, may be performed on the server computer 49 utilizing server processing applications 36d and associated stored procedures 69 which are under the control of the scheduled test runner 36c. The comparison may also be performed on the client computer 20 utilizing client comparison applications 36a.

In particular, the scheduled test runner 36c is responsible for providing the applications 36d or 36a with the scope of the comparison desired by the user, i.e., what objects are to be compared, which command information is similarly entered by user, as illustrated in FIG. 5, through a graphical user interface. As will be appreciated from the discussion which follows, the comparison result objects which are produced as a result of the comparison performed in step 80 generally allow the researchers, engineers, etc. to track development, evaluate and assure quality, and assess suitability of the NLP application under test.

By way of example, the pass/fail status of a test run of an NLP application can be evaluated by examining the comparison result objects which are created by applications 36d or 36a from a comparison between the actual result objects and the human verified, expected result objects. Similarly, the changed status of a NLP application can be evaluated by examining the comparison result objects which are created by applications 36d from a comparison between the actual result objects of one test run to the actual result objects of a different or previous test run. The latter comparison would be prohibited for test cases that have no previous actual result objects.

When a comparison is initiated, the internal identifier tags of the actual result objects are first mapped to human readable labels using a conventional pointer mapping technique. By way of example, when performing a comparison between the illustrated actual result object-A and the illustrated expected result object-B, human-readable labels "Uncapitalized First Word" and "Comma with Adverbials" would be mapped to "Critique_198" and "Critique_123", respectively. The human-readable labels, "Uncapitalized First Word" and "Comma with Adverbials", used in the above example are drawn from a map table which has been defined in connection with the expected result object set of which expected result object-A is a member. Utilizing such a mapping technique, compatibility between any two object sets which are the subject of a comparison procedure may be ensured, e.g., by using two label maps actual result object sets from two different NLP application test runs can be compared even if the internal identifiers have changed. Additionally, this technique also allows the internal identifiers to be dynamically mapped to labels of varying specificity, e.g., "their/there confusion" instead of the more general "Word Confusion." According to this format, the exemplary actual result object B would then appear as follows:

| Actual Result-B' | | | | |
|---|---|---|---|---|
| ID TAG | | | | |
| Uncapitalized First Word | 1 | 5 | cause | Cause |
| Comma with Adverbials End of Results | 42 | 5 | never | never, |

To avoid confusion during the comparison process, a recognizable null identifier may be used to map to internal tag identifiers which do not have a corresponding human-readable label in a mapping table.

The comparison result objects which are generated as a result of the comparison procedure are also stored in the database 62. The structure of the comparison result objects are the same as discussed previously for this example excepting that an additional field is added for flagging noncomformaties. For example, the comparison result object generated by comparing Expected Result-A with Actual Result-B' would appear as follows:

| | Comparison Result | | | | |
|---|---|---|---|---|---|
| | ID TAG | | | | |
| | Uncapitalized First Word | 1 | 5 | cause | Cause |
| > | Comma with Adverbials End of Results | 42 | 5 | never | never, |

Furthermore, the comparison result objects stored within the database 62 can be limited to any desired level of granularity by specifying that the comparison algorithm is to ignore certain columns and/or delete certain rows. For example, label-map entries can also change values to blanks in specified columns where the result would appear as follows:

| • "[Ignored Column List]" = "2 3 4" | | | | | |
|---|---|---|---|---|---|
| | ID TAG | | | | |
| | Uncapitalized First Word | 1 | 5 | cause | Cause |
| > | Comma with Adverbials End of Results | 42 | 5 | never | never, |

Label-map entries can also delete rows containing a specified value where the result would appear as follows:

| • "Uncapitalized First Word" = "[IgnoredRow]" | | | | | |
|---|---|---|---|---|---|
| | ID TAG | | | | |
| | Uncapitalized First Word | 1 | 5 | cause | Cause |
| > | Comma with Adverbials End of Results | 42 | 5 | never | never, |

Label-map entries can also be employed to sort rows and/or columns before a comparison.

As discussed previously, the expected result, actual result, and comparison result objects are preferably provided with an identification tag. The identification tag allows the object to be similarly mapped into groups which provides a way to organize the objects into static and dynamic collections such that objects can be more efficiently tracked and/or manipulated. Again, varying degrees of specificity can be achieved. The use of group objects which contain lists of other objects additionally allows the objects to be grouped into webs or nested hierarchies of named groups. In a preferred embodiment, all objects have at least the following properties:
tblObject
.iObjectID . . . Unique numeric object identifier.
.iObjectType . . . Group (1), Custom Property (2), Query (3), Phrase (4), User (5), User Configuration (6), etc.
.vName . . . A string containing the object's name.
.iLanguaqe . . . The system supports single-byte and double-byte strings in multiple languages (stored on SQL Server as binary, case-sensitive text). Objects identify the language in which they were created, and can only be edited on systems with compatible code pages.
.iOwnerID . . . The identifier of the user or user group that can modify this object.
.fReadOnly . . . False if editing is allowed, True to lock the object and prevent accidental modification.
.dCreated . . . Date and time the object was created.
dModified Date and time the object was last modified.

Figure 7:
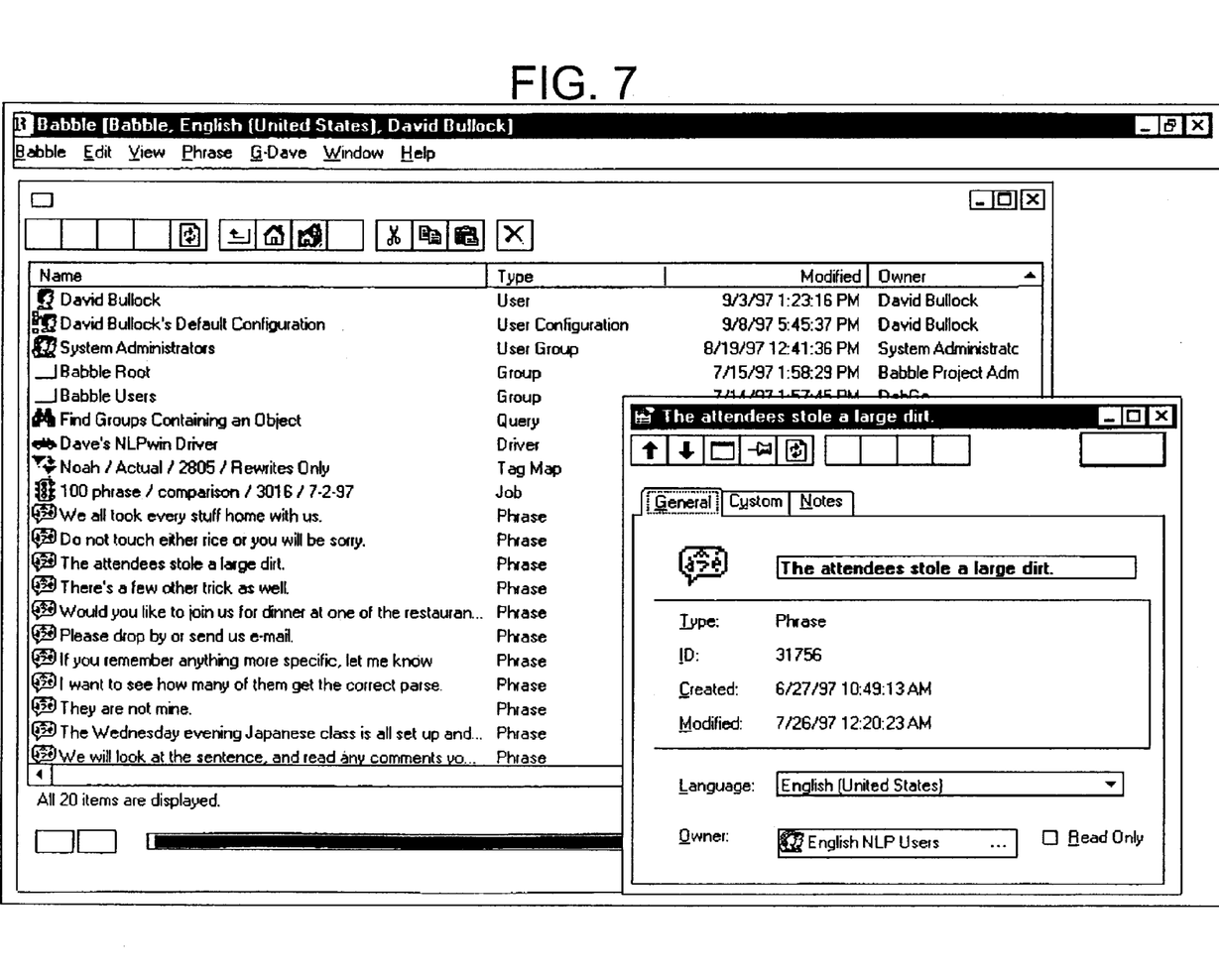

The group structure is particularly useful for navigation through the objects in the system. To perform the tasks associated with navigation, each of the computer systems 20 also preferably include stored procedures 61 for performing the tasks associated with querying/searching the database 62 and/or for editing information stored in the database 62. These procedures cooperate with the user interface application 36b to provide a graphical user interface, an example of which is illustrated in FIG. 7, which allows objects to be listed in a group or returned as a result of a query. As further illustrated in FIG. 7, additional graphical user interfaces can be utilized to display and edit details or properties for a single object in the list. The contents displayed in such graphical user interfaces may be copied using file and clipboard applications 36e after which the contents can be imported into other user applications such as a word processor, spread sheet, etc.

Utilizing the stored procedures 61, it is contemplated that various levels of queries can be devised to search the database 62 for objects. For example, a simple query can be initiated to return all objects which are members of a given object group or a more complex query can be initiated to return all objects which are members of a given object group and which have a specified identification tag. Additional complex queries can be initiated to return all objects having a specified internal identifier. A further efficiency feature allows the query to return a limited number of results or a slice of the result set, e.g., every nth record to a maximum of m.

From the foregoing, it will be appreciated that the subject invention provides for efficient linguistic tagging, corpora management, bug finding, communication, and automated regression testing as well as a method for storing objects which facilitates sophisticated techniques for quality measurement and problem classification. Accordingly, the subject invention provides a significantly more thorough and efficient way to measure application product quality.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Additionally, while the description herein concentrates on results which would normally be produced by a grammar checker, it will be appreciated that this implementation is not meant to be limiting. Therefore, the invention as described herein contemplates all such embodiments as may come within the scope of the following claims and equivalents thereof.

We claim:

1. A computer-readable medium having computer-executable instructions for performing steps within a computer system comprising:

initiating the execution of a computer-executable application, which generates an output containing information intended for display to a user of the application in response to an input;

providing as the input to the computer-executable application a test object collected from a database, wherein the test object includes one or more intentional errors;

creating an actual result object from the output generated by the computer-executable application in response to the input, the actual result object having one or more machine-readable tags associated with the errors in the test object;

mapping the one or more tags to human-readable labels derived from an expected result object;

performing a comparison between the actual result object and an object selected from a group consisting of the expected result object and a previously generated actual result object; and storing the results of the comparison in the database as a comparison result object that includes the one or more machine readable tags that are dynamically mappable to the human readable labels such that the comparison result object is available to the user as an aide in debugging the computer-executable application.

2. The computer-readable medium as recited in claim 1, further comprising instructions for performing the step of storing the actual result object in the database whereafter the archived actual result object is available for use as the previously generated actual result object in subsequent executions of the computer-executable instructions.

3. The computer-readable medium as recited in claim 1, further comprising instructions for performing the step of generating a graphical user interface through which a user may schedule a time at which the execution of the computer-executable application is initiated.

4. The computer-readable medium as recited in claim 1, further comprising instructions for performing the step of generating a graphical user interface through which a user may create the expected result object.

5. The computer-readable medium as recited in claim 1, further comprising instructions for generating a graphical user interface through which the user may query the database.

6. The computer-readable medium as recited in claim 1, wherein the instructions which perform the step of initiating the execution of the computer-executable application initiate the execution of a NLP application.

* * * * *